United States Patent
Koneru et al.

(10) Patent No.: US 6,924,812 B2
(45) Date of Patent: Aug. 2, 2005

(54) METHOD AND APPARATUS FOR READING TEXTURE DATA FROM A CACHE

(75) Inventors: Satyaki Koneru, Folsom, CA (US); Steven J. Spangler, El Dorado Hills, CA (US); Val G. Cook, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 10/328,988

(22) Filed: Dec. 24, 2002

(65) Prior Publication Data

US 2004/0119719 A1 Jun. 24, 2004

(51) Int. Cl.[7] ............................................. G06T 11/40
(52) U.S. Cl. ........................ 345/552; 345/554; 345/557; 711/118; 711/131; 711/149
(58) Field of Search ............................... 345/552, 554, 345/557, 582, 583, 587; 711/118, 125, 129–132, 149

(56) References Cited

U.S. PATENT DOCUMENTS

| | | | | |
|---|---|---|---|---|
| 4,905,141 A | * | 2/1990 | Brenza | ........................ 711/129 |
| 6,433,789 B1 | * | 8/2002 | Rosman | ....................... 345/582 |
| 6,744,438 B1 | * | 6/2004 | Baldwin | ....................... 345/552 |

* cited by examiner

Primary Examiner—Matthew C. Bella
Assistant Examiner—Mackly Monestime
(74) Attorney, Agent, or Firm—Sharon Wong (57) ABSTRACT

A texture data reading apparatus includes a cache memory including a plurality of read ports and a plurality of regions to store pixel texture data. An address comparator includes a plurality of input ports to receive incoming pixels, wherein the address comparator compares the memory addresses associated with the incoming pixels to determine which regions of cache memory are accessed. A cache lookup device accesses new texture data from the cache memory for the incoming pixels in the same clock cycle in response to the number of memory regions accessed being less than or equal to the number of cache memory read ports.

17 Claims, 6 Drawing Sheets

METHOD AND APPARATUS FOR READING TEXTURE DATA FROM A CACHE

BACKGROUND

A graphics engine is commonly used for displaying images on a display screen that can be comprised of two dimensional data and/or three dimensional graphical objects that are rendered to a two dimensional surface in memory. This rendering is typically accomplished by breaking the previously mentioned objects up into a series of polygons, typically, triangles. At each vertex attribute values such as color, lighting, fog, depth, etc. and texture coordinates are assigned. By utilizing texture mapping in addition to attribute interpolation such as color, depth, lighting, fog, etc., significant detail can be applied to each pixel of a polygon to make them appear more realistic.

The texture map can combine a pattern or image with the interpolated attributes of the polygon to produce a modified color per pixel with the added detail of the texture map. For example, given the outline of a featureless cube and a texture map containing a wood-grain pattern, texture mapping can be used to map the wood-grain pattern onto the cube. Typically, a two-dimensional texture pattern is mapped or warped onto a three-dimensional surface. Perspective transformations are used to calculate the addresses within the texture map of the texels (pixels within the texture map) needed to render the individual pixels of the primitive (triangle, line, point) on the display screen. Once texture addresses have been calculated for each pixel to be rendered, the texture map that is stored in a main memory are accessed, or fetched into a cache on the graphics engine. Conventionally, the number of cache read ports must equal the number of pixels that can be accessed in parallel. Oft times, however, this many read ports are not necessary due to spatial locality of the pixels.

DETAILED DESCRIPTION

In the following description, numerous specific details are set forth such as specific memory configurations, address ranges, protection schemes, etc., in order to provide a more thorough understanding of the present invention. It will be apparent, however, to one skilled in the art, that the present invention may be practiced without these specific details. In other instances, well known apparatus and steps have not been described in detail in order to avoid obscuring the invention.

Embodiments of the present invention provide for selectively reading texture data for a greater number of pixels per clock than the number of available cache read ports. For example, the present invention is able to selectively process four pixels per clock, instead of just two pixels per clock, with a two-port read cache. This allows an almost doubling in pixel rate with less die growth than would be required by doubling the number of cache ports. Embodiments of the invention default to reading texture for two pixels per clock from the two-port read cache.

Figure 1:
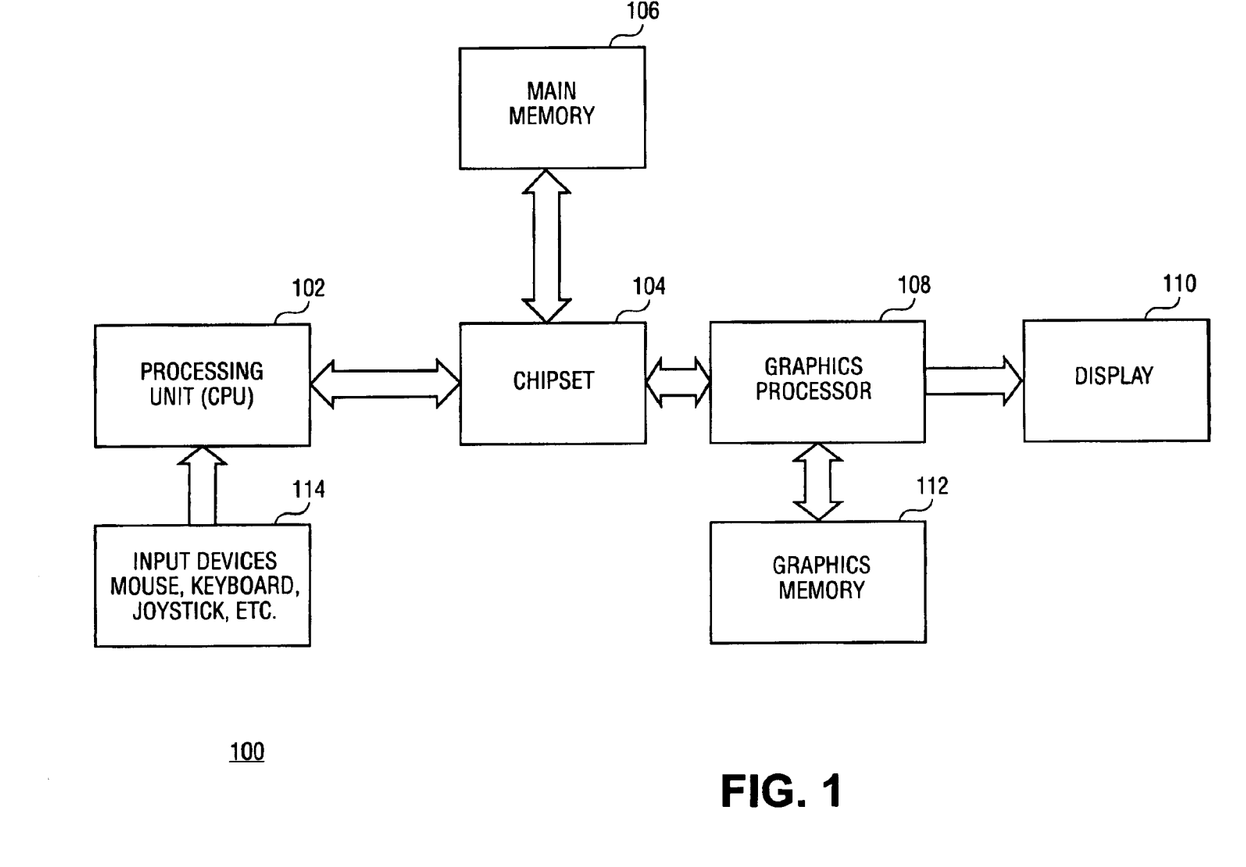
FIG. 1 illustrates a functional block diagram of an embodiment of an exemplary computer system including a graphics engine embodying the present invention.

FIG. 1 illustrates a functional block diagram of an embodiment 100 of an exemplary computer system including a graphics processor 108 embodying the present invention. This system generally includes processing unit 102, bridge 104, main memory 106, graphics processor 108, display 110, graphics memory 112 and input devices 114. Graphics processor 108 determines the graphical information to be sent to display 110 based on inputs from processing unit 102 and data in main memory 106 and graphics memory 112. Processing unit 102 has access to data stored on disk, networks, or CD-ROM, etc. and based on power on sequences, programs booted at start up, and user inputs by the input devices, processing unit 102 will determine the data stream sent to the graphics processor 108. Graphics processor 108 uses the data stream to create the desired image on display 110. The user is linked to the computer image generation process through input control device 114 such as a keyboard, mouse, joystick, etc.

In particular, processing unit 102 obtains database information from one of it's data input, loads texture maps into main memory or graphics memory and then performs pre-processing of database information for graphics processor 108. Graphics processor 108 then will receive state data and triangle, line, or point (primitive) information. From this input data, graphics processor 108 determines attribute data (such as diffuse red, green, blue colors, alpha, fog, depth, texture coordinates, etc) for each pixel of the primitive. The texture coordinate attributes and pixel screen location are used to read texture, previous color and depth information. This data is then used to determine the new color and depth of each pixel to be stored in either graphics memory 112 or main memory 106. When the primitives have been rendered, processing unit 102 schedules the resulting rendered scene to be displayed on display 110 if desired.

Texture mapping is used to place texture data such as pattern or natural images on an object in computer graphics. The object is typically formed using a plurality of polygons, such as a triangle polygon or a square polygon. By using texture mapping, a realistic picture can be generated. Since an object is generally formed from a plurality of polygons such as triangles, texture data is mapped as each polygon unit. When mip mapping or trilinear interpolation is enabled, the projected pixel size on the texel map approaches a texel size of the properly selected texture LOD. If the projected pixel increases or decreases in size appreciably, the next level of detail texture resolution map is used. This can be either a higher or lower map. With respect to such texture data mapping, the texture data is stored in a memory beforehand.

Figure 2:
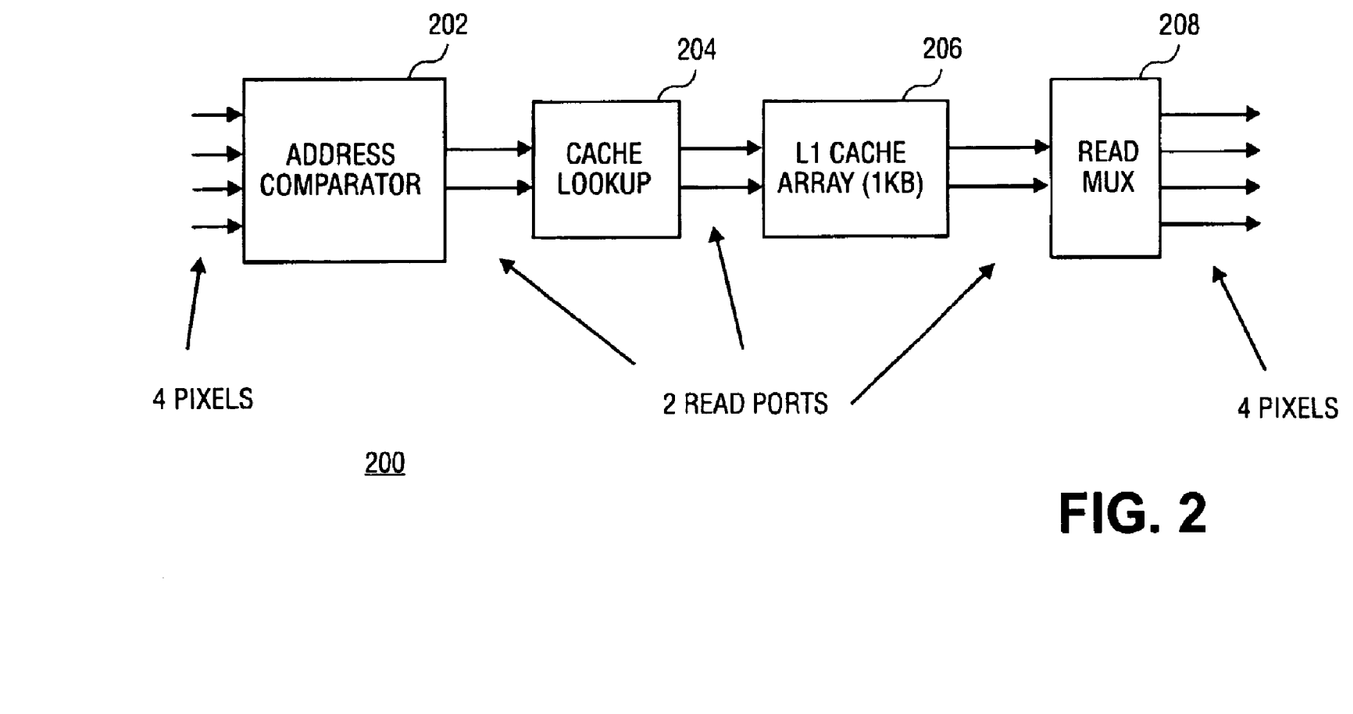
FIG. 2 illustrates a functional block diagram of an embodiment of a texture reading apparatus.

FIG. 2 illustrates a functional block diagram of an embodiment 200 of an exemplary apparatus for reading texture data from a memory. Texture data reading apparatus 200 includes memory address comparator 202, cache lookup 204, cache 206 and read multiplexor 208. Texture data is mapped in such a manner that a texture data reading apparatus 200 reads texture data from cache 206 that temporarily stores texture data. Texture dating reading apparatus 200 reads texture data from cache 206 at high speed. Embodiments of the present invention provide for selectively reading texture data for a greater number of pixels per clock than the number of available cache read ports.

In particular, memory address comparator 202 compares the memory address of incoming pixels (and for which texture data is read from the cache 206) and determines whether or not one or more pixels have memory addresses that access the same cache region (for example, cache line). If the number of cache regions accessed is less than or equal to the number of read ports on the cache 206, all of the incoming pixels can be accessed in the same clock cycle. However, if the number of cache regions accessed is greater than the number of read ports on the cache 206, than the incoming pixels are read in more than one clock cycle. For example, the present invention is able to selectively process four pixels per clock, instead of just two pixels per clock, with a two-port read cache. This allows an almost doubling in pixel rate with less die growth than would be required by doubling the number of cache ports. Embodiments of the invention default to reading texture for two pixels per clock from the two-port read cache.

Each pixel supplies a texture map memory address to address comparator 202 through input terminals. Memory address includes U, V, W, LOD, and other parameters. For example, a texture address calculator calculates the texture memory addresses (U, V) for each pixel and also the specific LODs from which the texture addresses are to be retrieved. For texture mapping, the texture data from the memory is read in accordance with calculated memory addressing as follows:

Texture coordinates (S1, T1, W1), (S2, T2, W2), and (S3, T3, W3) are designated to vertexes of a triangle.

By linearly interpolating the texture coordinates of the vertexes of the triangle, texture coordinates (S, T, W) of an inner point of the triangle are obtained.

By performing dividing operations of U=S/W and V=T/W, a memory address (U, V) is obtained.

As shown in FIG. 2, for example, four pixels are applied to address comparator 202 for processing by two-port cache 206. When two of the incoming pixels have memory addresses that access the same cache line and the remaining two of the pixels have memory addresses that access another cache line, data for all four of the incoming pixels can be read in one clock cycle since two cache lines can be read at the same time. Address comparator 202 thus makes a determination regarding whether it can read all of the data out of the cache 206 in a single clock or more than once cycle (for example, by defaulting to sequencing two pixels at a time).

Referring to FIG. 2, address comparator 202 determines whether or not one or more pixels have memory addresses that access the same cache region (for example, cache line). Once the appropriate texture data is determined to be able to be read in a single cycle from cache 206 because the same cache regions are being accessed, cache lookup 204 does the cache lookup on the selected addresses and accesses the data from cache 206 based on the selected addresses. The compared result is provided to cache lookup 204. Cache lookup 204 selects only the memory addresses of the texture data that should be read from cache 206 in accordance with the compared result. For example, in a typical implementation, cache lookup 204 accesses just two addresses for four pixels and accesses data out of cache 206 for those two selected addresses. Thus, where there is a need to access only two cache lines, address comparator 202 takes four addresses coming in and consolidates them into two addresses that are applied to cache lookup 204.

If the address comparator determines that more cache lines are accessed than available cache ports, the first two pixels are processed via the two ports on a first clock cycle, and then on the next clock cycle, the other two are processed via the two ports. The texture data accessed is reassembled into four pixels at the back end. The address comparator stalls the pipeline to allow for two clock cycles, rather than one clock cycle, to process four pixels.

Cache 206 outputs the appropriate texel data into read multiplexor 208 to assemble the accessed texture data with the incoming pixels. Read multiplexor 208 takes into account how the ports were mapped with the pixels during the assembling process. For example, in a typical implementation, cache 206 includes output ports A and B. Port A reads cache lines for pixels 0 and 1 and port B reads cache lines for pixels 2 and 3. Read multiplexor 208 expands the texel data back out to four pixels.

Figure 3:
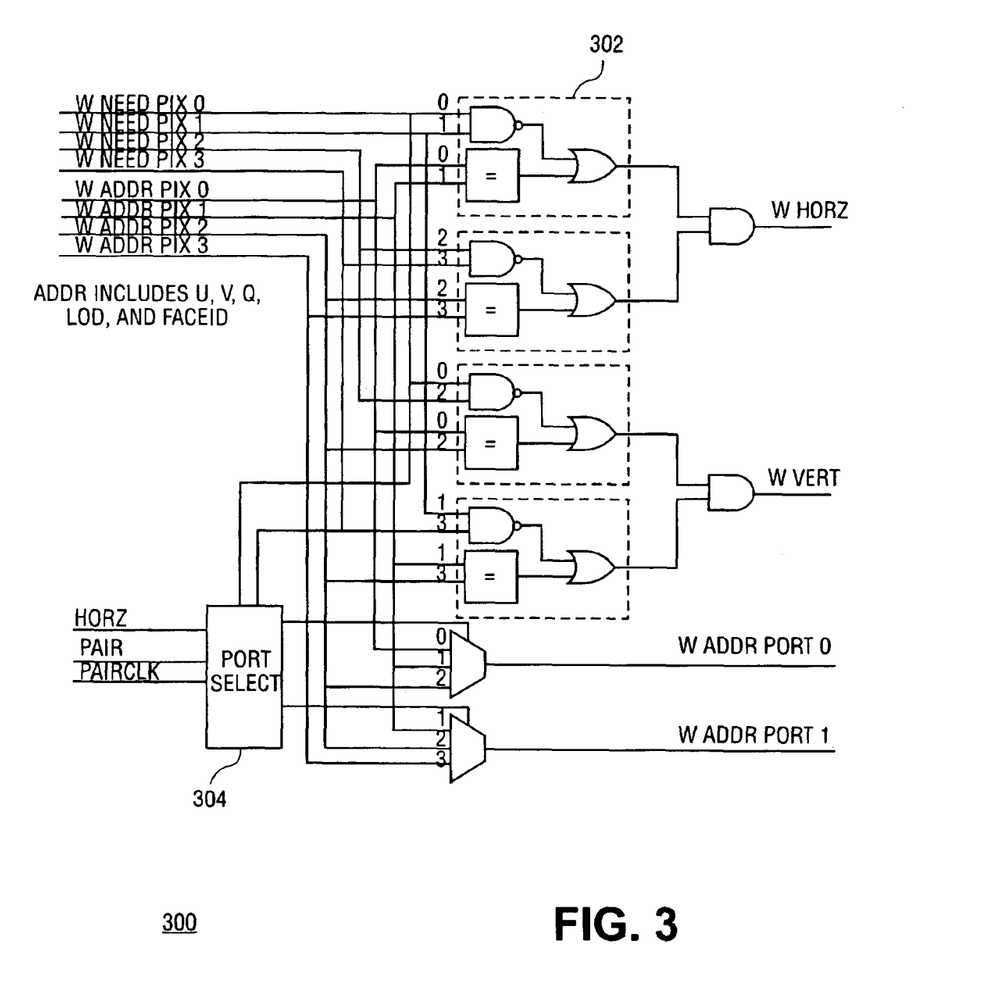
FIG. 3 illustrates a logic diagram of an embodiment of an address comparator.

FIG. 3 illustrates a logic diagram of an embodiment 300 of address comparator 302 and port select 304. The address comparator receives cache line addresses. In a cache having four sectors, each pixel may need four cache lines but the four sectors (for example, W, X, Y, Z) can be treated independently. For each sector, only two cache lines can be read at a time. Thus, in a two-port read cache configuration, 2 W's, 2 X's, 2 Y's and 2 Z's can be read in a typical implementation. The address comparator compares the addresses (for example, the U's and V's) for all four incoming pixels and determines whether it can read the cache line for the four pixels out of two-port read cache. In some cases, the incoming pixels may have addresses that do not access data from the W sector at all and only accesses data from the X sector. The cache lines for the X, Y and Z sector are considered in the same manner before determining whether one or two clocks are needed (i.e. whether all four pixels can be accessed in the same clock cycle). However, if the four incoming pixels have addresses that access data from 3 or 4 different W's, then the pixels are processed two, rather than four, pixels per clock.

Address comparator 302 compares addresses for a single sector (W/X/Y/Z), taking into account the need bits for each pixel. Output is a horizontal ("horz") and vertical ("vert") compare indicator, which, when asserted, indicates that this sector can share ports in this direction. For example, "horz" indicates that a port can be shared between each pair of horizontally adjacent pixels and "vert" indicates the same for vertically adjacent pixels. Port select 304 selects the address to be used for this sector on each of the two ports. This determination takes into account the global "pair" bit and two of the need bits as well as the global horizontal indicator. The "pair" signal indicates that the result of the comparison on all four sectors indicated a need to run the subspan as two pixel pairs. In this case, "pairclk" indicates which clock (0 or 1) of the pair is on. One skilled in the art will recognize that the above comparison method is for exemplary purposes only. The present invention can be implemented with any viable comparison method compatible with the invention.

Figure 4:
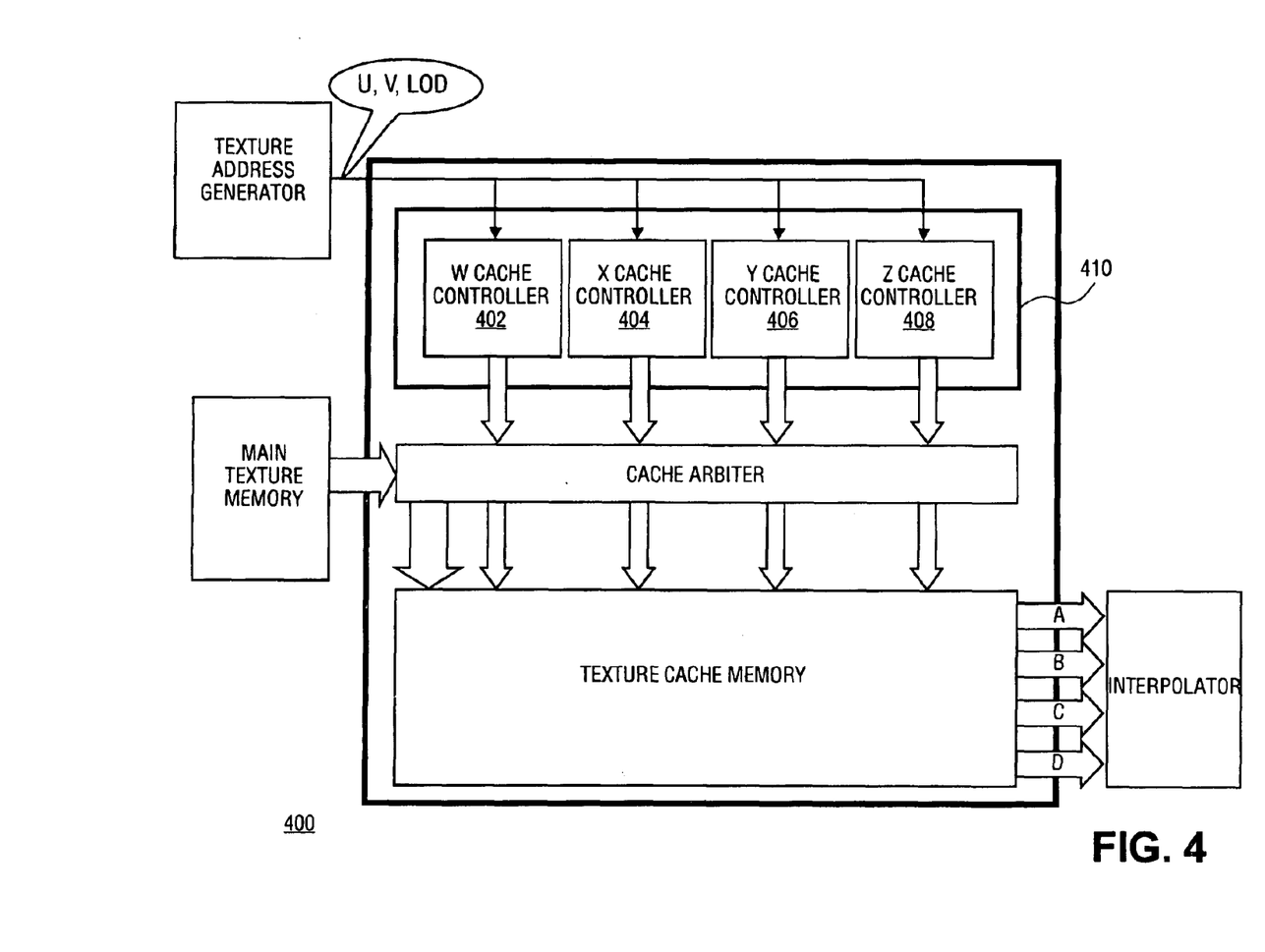
FIG. 4 illustrates a diagram of an embodiment of a cache controller.

FIG. 4 illustrates a diagram of an embodiment 400 of a cache controller. Cache controller includes W, X, Y and Z cache controllers 402, 404, 406 and 408, each of which regulate and keep track of what is accessed and stored in the sectors of the cache. Cache controller 400 includes four separate controllers, one for each the W, X, Y and Z partition. Each one of these controllers contains a plurality of stages, with each stage referencing a double quad word in the cache memory bank. The controllers regulate and keep track of what is stored in the cache memory banks. There is a separate cache controller for each of the W, X, Y, and Z partitions.

Embodiments of the present invention compare the memory address of incoming pixels (and for which texture data is read from the cache) and determine whether or not one or more pixels have memory addresses that access the same cache region (for example, cache line). If the number of cache regions accessed is less than or equal to the number of read ports on the cache, all of the incoming pixels can be accessed in the same clock cycle. However, if the number of cache regions accessed is greater than the number of read ports on the cache, than the incoming pixels will have to be read in more than one clock cycle. For example, as noted above, addresses for a single sector (W/X/Y/Z), taking into account the need bits for each pixel are compared. Output is a horizontal ("horz") and vertical ("vert") compare indicator, which, when asserted, indicates that this sector can share ports in this direction.

Figure 5:
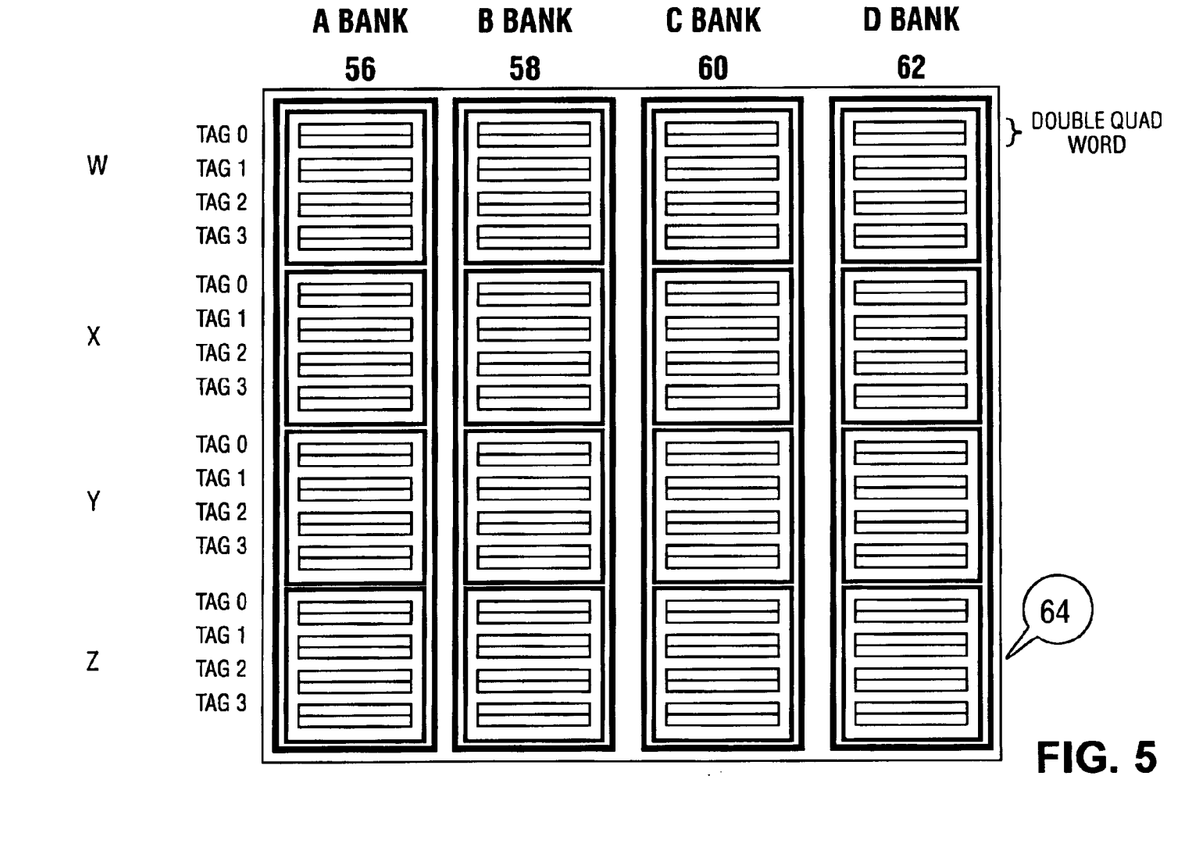
FIG. 5 illustrates a diagram of an embodiment of a cache memory organization.

FIG. 5 illustrates a diagram of an embodiment 500 of an exemplary cache memory organization. One skilled in the art will recognize that particular configuration of the cache is not critical to the invention. In one exemplary configuration, the cache memory storage organization is indexed by parameters, including W, X, Y and Z; tag 0, tag 1, tag 2, and tag 3. The cache memory includes four sectors of memory: W, X, Y and Z. W, X, Y and Z contain 8 cache lines, each cache line containing 8 texels.

There are four rows of data corresponding to the four cache controllers labeled W, X, Y, and Z shown in FIG. 4. Each row has four sub-rows identified by tags 0, 1, 2, and 3. Each tagged sub-row has an odd and even sub-row associated with it. Each comparator cache controller provides the mapping from U, V, and LOD to the proper tag location for access to necessary texels. This is performed by the four stages in each cache controller.

Referring to FIGS. 4 and 5, cache controller 400 and cache memory 500 work together as address decoder and memory storage, respectively. When the cache controller 400 is presented with a U, V, Q, LOD and other address parameters, it responds with the proper tags where the proper A, B, C, and D texels can be retrieved from cache memory 500. This retrieval process can happen per clock since the data has been pre-fetched and is residing in the texture cache memory. The cache controller 400 uses the texture addresses most significant bits to determine its location and hit, miss information, while the selection of the unique location of the A, B, C, and D types, and the partition block descriptor W, X, Y, Z is determined from the least significant bits.

Figure 6:
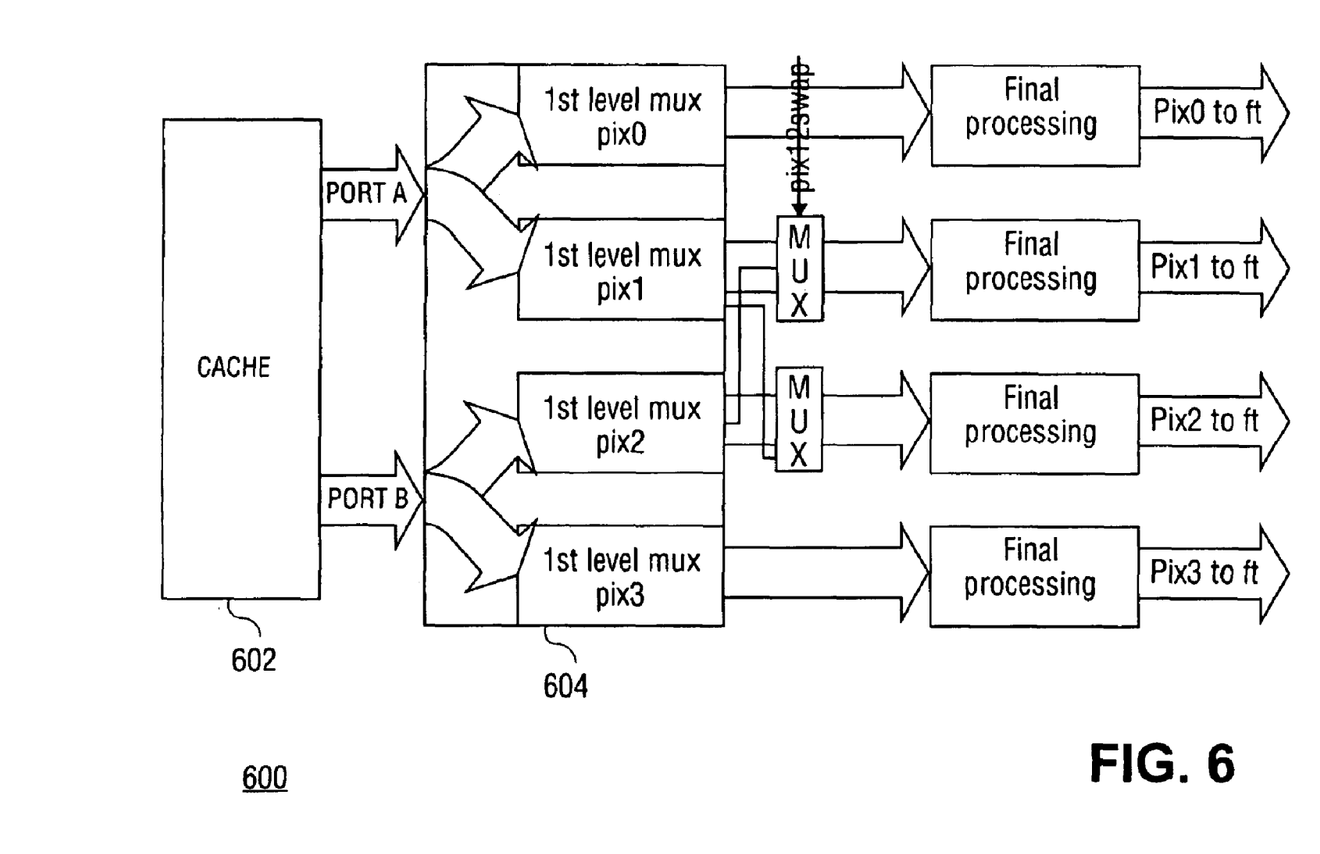
FIG. 6 illustrates a diagram of an embodiment of the back end of texture reading apparatus.

FIG. 6 illustrates a diagram of an embodiment 600 of the back end of texture reading apparatus. Cache 602 outputs the appropriate texel data into read multiplexor 604 to assemble the accessed texture data with the incoming pixels. Read multiplexor 604 takes into account how the ports were mapped with the pixels during the assembling process. For example, in a typical implementation, cache 602 includes output ports A and B. Port A reads cache lines for pixels 0 and 1 and port B reads cache lines for pixels 2 and 3. Read multiplexor 604 expands the texel data back out to four pixels.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A texture data reading apparatus, comprising:
   a cache memory including a plurality of read ports and a plurality of regions to store pixel texture data;
   an address comparator including a plurality of input ports to receive incoming pixels, wherein the address comparator compares memory addresses associated with the incoming pixels to determine which regions of cache memory are accessed; and
   a cache lookup device to access new texture data from the cache memory for the incoming pixels in the same clock cycle in response to the number of memory regions accessed being less than or equal to the number of cache memory read ports.

2. The texture data reading apparatus claimed in claim 1, further comprising:
   a multiplexor to associate pixel texture data accessed from the cache memory region associated with each incoming pixel.

3. The texture data reading apparatus claimed in claim 1, wherein the cache regions include cache lines.

4. The texture data reading apparatus claimed in claim 1, wherein the number of cache read ports is less than the number of address comparator input ports.

5. The texture data reading apparatus claimed in claim 1, wherein the cache lookup device accesses new texture data from the cache memory for the incoming pixels in more than one clock cycle in response to the number of memory regions accessed being greater than the number of cache memory read ports.

6. A rendering apparatus for generating drawing image data, comprising:
   a coordinate processing unit for receiving vertex data of a polygon including coordinates of the vertices, and for generating coordinate data representing coordinates in the polygon from the coordinates of the vertices of the polygon;
   a cache memory including a plurality of memory read ports and a plurality of regions to store pixel texture data;
   an address comparator to receive vertex data of the polygon including texture coordinates of the vertices and to generate texture addresses in the polygon from the texture coordinates of the vertices of the polygon, the texture addresses referring to texture data in the cache memory, wherein the address comparator compares the texture addresses associated with incoming pixels to determine which regions of cache memory are accessed; and
   a cache lookup device to access new texture data from the cache memory for the incoming pixels in the same clock cycle in response to the number of memory regions accessed being less than or equal to the number of cache memory read ports.

7. A rendering apparatus for generating drawing image data, comprising:
   a cache memory including a plurality of memory read ports and a plurality of regions to store pixel texture data; and
   a plurality of rendering units for receiving vertices data of a polygon and for generating data for drawing an image each rendering unit including a texture memory and a reading unit for reading texture data from the texture memory; and wherein each reading unit includes:

an address comparator to receive vertex data of the polygon including texture coordinates of the vertices and to generate texture addresses in the polygon from the texture coordinates of the vertices of the polygon, the texture addresses referring to texture data in the cache memory, wherein the address comparator compares the texture addresses associated with incoming pixels to determine which regions of cache memory are accessed; and a cache lookup device to access new texture data from the cache memory for the incoming pixels in the same clock cycle in response to the number of memory regions accessed being less than or equal to the number of cache memory read ports.

8. A machine readable medium having stored therein a plurality of machine readable instructions executable by a processor to read texture data, comprising:

instructions to compare the-memory addresses associated with incoming pixels to determine which regions of cache memory are accessed;

instructions to access new texture data from the cache memory for the incoming pixels in the same clock cycle in response to the number of memory regions accessed being less than or equal to the number of cache memory read ports; and instructions to read cache ports and a plurality of regions to store pixel texture data.

9. The machine readable medium claimed in claim 8, further comprising:

instructions to associate pixel texture data accessed from the cache memory region associated with each incoming pixel.

10. The machine readable medium claimed in claim 8, wherein the cache regions include cache lines.

11. The machine readable medium claimed in claim 8, wherein the number of cache read ports is less than the number of address comparator input ports.

12. The machine readable medium claimed in claim 8, further comprising:

instructions to access new texture data from the cache memory for the incoming pixels in more than one clock cycle in response to the number of memory regions accessed being greater than the number of cache memory read ports.

13. A method to read texture data, comprising: comparing memory addresses associated with incoming pixels to determine which regions of cache memory are accessed;

accessing new texture data from the cache memory for the incoming pixels in the same clock cycle in response to the number of memory regions accessed being less than or equal to the number of cache memory read ports; and reading cache ports and a plurality of regions to store pixel texture data.

14. The method claimed in claim 13, further comprising:

associating pixel texture data accessed from the cache memory region associated with each incoming pixel.

15. The method claimed in claim 13, wherein the cache regions include cache lines.

16. The method claimed in claim 13, wherein the number of cache read ports is less than the number of address comparator input ports.

17. The method claimed in claim 13, further comprising:

accessing new texture data from the cache memory for the incoming pixels in more than one clock cycle in response to the number of memory regions accessed being greater than the number of cache memory read ports.

* * * * *